July 1, 1952 J. E. COPE ET AL 2,602,147

MAGNETIC DEFLECTION CIRCUITS

Filed Nov. 23, 1949

Inventor
JOHN EDWARD COPE AND
LESLIE WALTER GERMANY
By Blair & Black
Attorney

Patented July 1, 1952 2,602,147

UNITED STATES PATENT OFFICE 2,602,147

MAGNETIC DEFLECTION CIRCUITS

John E. Cope and Leslie W. Germany, Cambridge, England, assignors to Pye Limited, Cambridge, England, a British company Application November 23, 1949, Serial No. 129,008
In Great Britain November 24, 1948

11 Claims. (Cl. 315—27)

The present invention relates to an arrangement for stabilizing the scanning waveform used for the magnetic deflection of cathode ray tubes or the like, such as the cathode ray tube used for reproducing television pictures or the pick-up tube used in television cameras.

According to the present invention the magnetic deflecting circuits of a cathode ray tube or the like are provided with means for producing a feed-back voltage which is proportional to current, as distinct from voltage, whereby the form and amplitude of the current flowing through the deflection coils are maintained constant, and thus both the amplitude and the linearity of the scan are stabilized. A feature of the invention consists in the employment of a transformer (either balanced or unbalanced) in the feed-back circuit.

Figure 1:
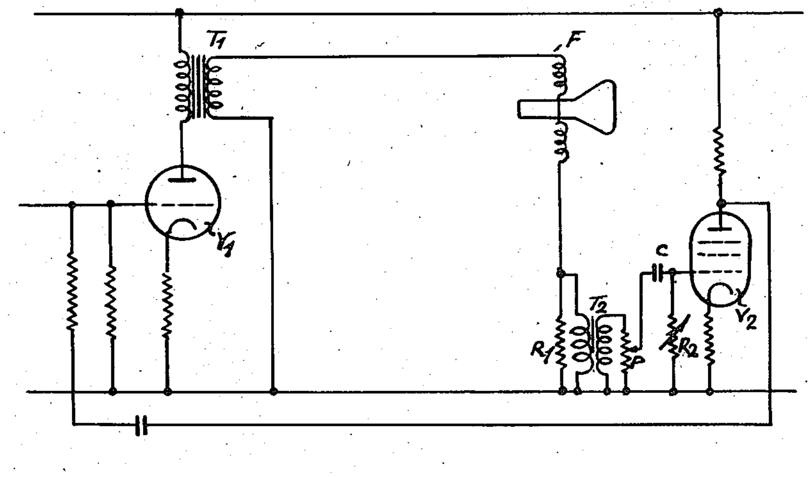
Figure 2:
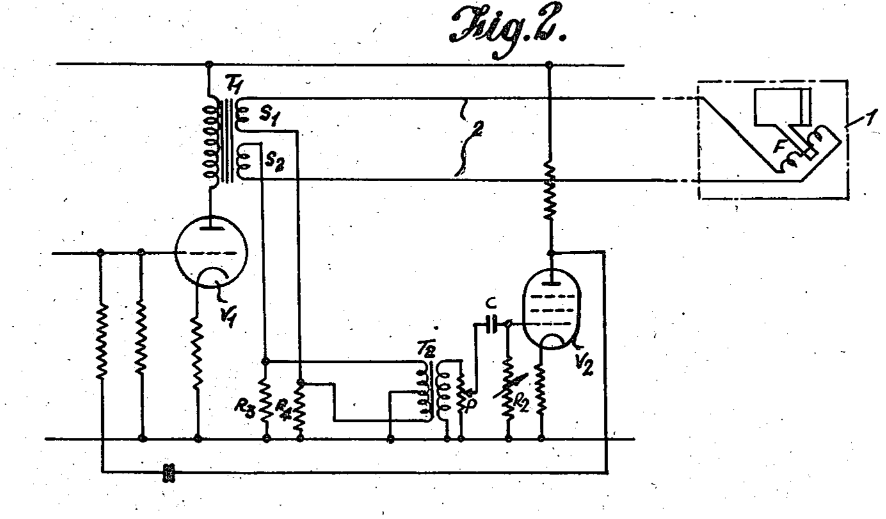

In order that the invention may be more clearly understood, reference will now be made to the accompanying drawings which show, by way of example, various embodiments thereof and in which:

Fig. 1 shows a circuit arrangement for stabilizing the frame scan of a television receiver and Fig. 2 shows a circuit arrangement for stabilizing the frame scan of a television camera.

Referring to Fig. 1, V1 is an amplifier valve for the frame scanning waveform which is connected to the frame coils F through the transformer T1. Connected in series with the frame coils F is a resistance R1 across which is shunted the primary winding of a transformer T2, the secondary of which is connected via the potentiometer P and condenser C to the grid of amplifier valve V2. The resultant voltage variations at the anode of V2 are thus proportional to the current flowing through the frame coils F, and this voltage is fed back to the input of the valve V1 to stabilize the scanning waveform, both as regards linearity and amplitude. The amplitude of the feed-back voltage may be adjusted by means of the potentiometer P, and the control of linearity may be effected by the variable resistor R2.

The employment of a feed-back voltage which is proportional to the current flowing through the coils renders the method of stabilizing according to this invention applicable to balanced feeders. One such embodiment is illustrated in Fig. 2 in which F represents the magnetic deflection coils associated with the pick-up tube in a television camera which is indicated by dotted rectangle 1, the camera being connected to the scanning waveform generator by the cable 2 the ends of which are coupled to the primary of the transformer T1 connected in the output circuit of the scanning waveform amplifier valve V1 through the balanced secondary windings S1, S2. By reason of the fact that the length of the cable 2 may vary, particularly on outside broadcast television transmissions, the voltage drop produced by the cable will vary with its length, which would normally result in variation of the scanning amplitude. By employing a negative feed-back voltage which is proportional to the current flowing through the coils, however, the form and amplitude of the current flowing through the frame coils F may be maintained substantially constant irrespective of the length of cable employed between the camera and the scanning waveform generator.

As shown in Fig. 2, the free ends of the secondary windings S1 and S2 are connected to earth through resistors R3, R4, across which is connected the centre-tapped primary winding of a transformer T2, the secondary winding of which is connected to the valve V2 through a circuit similar to that shown in Fig. 1 with the result that the feed-back voltage derived from the anode of V2 is proportional to the current flowing in the deflection coil circuit.

Whilst a particular embodiment has been described, it will be understood that various modifications may be made without departing from the spirit of the invention. For example, the invention is not limited to frame scanning circuits. Furthermore, it will be clear that the resistances R1 in Fig. 1 and R3 and R4 in Fig. 2, which are used to control the effect of the feed-back circuit on the deflection circuit, can, by appropriate design of the other circuit components, be eliminated.

We claim:

1. A circuit arrangement for stabilizing the scanning waveform used for the magnetic deflection of a cathode ray beam, comprising means for generating a scanning waveform, a scanning output transformer having a primary winding and at least one secondary winding, said primary winding being connected to said generating means, deflecting coil means for deflecting said cathode ray beam, a feed-back transformer having a primary winding and a secondary winding, said primary winding of the feed-back transformer being connected in series with said deflecting coil means and the secondary winding of said scanning output transformer, a variable resistor connected across the secondary winding of said feed-back transformer, an electronic valve, having an anode, a cathode and at least one grid electrode, a condenser connecting said grid to one end of the secondary winding of said feed-back transformer, a second variable resistor connected between said grid and the other end of the secondary winding of said feed-back transformer, which is connected to said cathode and means connected to said anode for applying the voltage variations thereat as a negative feed-back voltage to said generating means.

2. A circuit arrangement for stabilizing the scanning waveform used for the magnetic deflection of a cathode ray beam, comprising means for generating a scanning waveform, a scanning output transformer having a primary winding and at least one secondary winding, said primary winding being connected to said generating means, deflecting coil means for deflecting said cathode ray beam, a feed-back transformer having a primary winding and a secondary winding, said primary winding of the feed-back transformer being connected in series with said deflecting coil means and the secondary winding of said scanning output transformer, an electronic valve, having an anode, a cathode and at least one grid electrode, a condenser connecting said grid to one end of the secondary winding of said feed-back transformer, a variable resistor connected between said grid and the other end of the secondary winding of said feed-back transformer which is connected to said cathode, and means connected to said anode for applying the voltage variations thereat as a negative feed-back voltage to said generating means.

3. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, two equal impedances, one end of each impedance being connected respectively to the other ends of each of the balanced secondary windings, the other end of each impedance being connected to a point of fixed potential, means connected between points of equal and opposite potential on said impedances for deriving a voltage proportional to the current flowing in said deflecting coil means and means for applying said voltage as a negative feed-back voltage to said generating means.

4. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, two equal impedances, one end of each impedance being connected respectively to the other ends of each of the balanced secondary windings the other end of each impedance being connected to a point of fixed potential, means connected between points of equal and opposite potential on said impedances for deriving a voltage proportional to the current flowing in said deflecting coils, means for adjusting the amplitude of said voltage, means for adjusting the linearity of said voltage and means for applying said voltage as a negative feed-back voltage to said generating means.

5. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, a feed-back transformer having a balanced primary winding and a secondary winding, said balanced primary winding being connected between the other ends of the balanced secondary windings of said scanning output transformer means connected to the secondary winding of said feed-back transformer for producing a voltage proportional to the current flowing in said deflecting coil means, and means for applying said voltage as a negative feed-back voltage to said generating means.

6. A circuit arrangement as claimed in claim 2, in which a resistor is connected across each half of the balanced primary winding of said feed-back transformer.

7. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, a feed-back transformer having a balanced primary winding and a secondary winding, said balanced primary winding being connected between the other ends of the balanced secondary windings of said scanning output transformer means connected to the secondary winding of said feed-back transformer for producing a voltage proportional to the current flowing in said deflecting coil means, means for adjusting the amplitude of said voltage means for adjusting the linearity of said voltage and means for applying said voltage as a negative feed-back voltage to said generating means.

8. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, a feed-back transformer having a balanced primary winding and a secondary winding, said balanced primary winding being connected between the other ends of the balanced secondary windings of said scanning output transformer means connected to the secondary winding of said feed-back transformer for producing a voltage proportional to the current flowing in said deflecting coil means, means for adjusting the linearity of said voltage and means for applying said voltage as a negative feed-back voltage to said generating means.

9. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, a feed-back transformer having a balanced primary winding and a secondary winding, said balanced primary winding being connected between the other ends of the balanced secondary windings of said scanning output transformer a variable resistor connected across the secondary winding of said feed-back transformer an electronic valve having an anode, a cathode and at least one grid electrode a condenser connecting said grid to one end of the secondary winding of said feed-back transformer, a second variable resistor connected between said grid and the other end of the secondary winding of said feed-back transformer which is connected to said cathode, and means connected to said anode for applying the voltage variations thereat as a negative feed-back voltage to said generating means.

10. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, a feed-back transformer having a balanced primary winding and a secondary winding, said balanced primary winding being connected between the other ends of the balanced secondary windings of said scanning output transformer an electronic valve having an anode, a cathode and at least one grid electrode, a condenser connecting said grid to one end of the secondary winding of said feed-back transformer, a variable resistor connected between said grid and the other end of the secondary winding of said feed-back transformer which is connected to said cathode, and means connected to said anode for applying the voltage variations thereat as a negative feed-back voltage to said generating means.

11. A circuit arrangement for stabilizing the scanning waveform used for the magnetic deflection of a cathode ray beam, comprising means for generating a scanning waveform, a scanning output transformer having a primary winding and two balanced secondary windings, said primary winding being connected to said generating means, deflecting coil means for deflecting said cathode ray beam, one end of each of said secondary windings being connected to said deflecting coil means, two equal resistors, one end of each resistor being connected respectively to the other ends of each of said balanced secondary windings, the other end of each resistor being connected to a point of fixed potential, a feed-back transformer having a center-tapped primary winding, and a secondary winding, the ends of said center-tapped primary winding being connected to said other ends of said balanced secondary windings, the center-tap on said primary being connected to said point of fixed potential, a variable resistor connected across the secondary winding of said feed-back transformer, an electronic valve having an anode, a cathode and at least one grid electrode, a condenser connecting said grid to one end of the secondary winding of said feed-back transformer, a second variable resistor connected between said grid and the other end of the secondary winding of said feed-back transformer, a cathode resistor connected between said cathode and said other end of the secondary winding of said feed-back transformer, and means connected to said anode for applying the voltage variations thereat as a negative feed-back voltage to said generating means.

JOHN E. COPE.
LESLIE W. GERMANY.

REFERENCES CITED

The following references are of record in the file of this patent:

UNITED STATES PATENTS

| Number | Name | Date |
|---|---|---|
| 2,230,819 | White | Feb. 4, 1941 |
| 2,384,717 | Wilson | Sept. 11, 1945 |
| 2,414,546 | Nagel | Jan. 21, 1947 |
| 2,492,090 | Bass | Dec. 20, 1949 |